(12) United States Patent
Babineau et al.

(10) Patent No.: US 7,407,283 B2
(45) Date of Patent: Aug. 5, 2008

(54) GOGGLE LENS, METHOD OF MANUFACTURING SAME, AND GOGGLE CONTAINING SAME

(75) Inventors: Joseph John James Babineau, Fitchburg, MA (US); James Raymond LeBlanc, Leominster, MA (US); Aaron Ryan Cyr, Townsend, MA (US); Donald Henry Salafia, New Ipswich, NH (US); Paul Isabelle, St. Augustin (CA)

(73) Assignee: Fosta-Tek Optics, Inc., Leominster, MA (US)

( * ) Notice: Subject to any disclaimer, the term of this patent is extended or adjusted under 35 U.S.C. 154(b) by 330 days.

(21) Appl. No.: 11/227,654

(22) Filed: Sep. 14, 2005

(65) Prior Publication Data

US 2007/0058130 A1    Mar. 15, 2007

(51) Int. Cl.
*G02C 7/02* (2006.01)

(52) U.S. Cl. ............... 351/159; 351/41; 351/53; 351/177; 351/166

(58) Field of Classification Search ............ 351/159
See application file for complete search history.

(56) References Cited

U.S. PATENT DOCUMENTS

| | | | |
|---|---|---|---|
| D135,237 S | 3/1943 | Bausch |
| D140,506 S | 3/1945 | Joyce |
| D141,029 S | 4/1945 | Splaine |
| D141,193 S | 5/1945 | Baratelli |
| D144,560 S | 4/1946 | Hansen |
| D145,288 S | 7/1946 | Di Cicco |
| 2,444,498 A | 7/1948 | Cochran |
| 2,472,731 A | 6/1949 | Splaine |
| 2,482,664 A | 9/1949 | Gagnon |
| 2,537,047 A | 1/1951 | Gatten |
| D163,869 S | 7/1951 | Hinman |
| 2,582,345 A | 1/1952 | Moeller |
| D176,316 S | 12/1955 | Fleming |
| D178,178 S | 7/1956 | Fleming |
| D187,394 S | 3/1960 | Moeller |
| D198,052 S | 4/1964 | Petitto |
| 3,133,982 A | 5/1964 | Janz |
| 3,140,390 A | 7/1964 | Smith et al. |
| D198,996 S | 8/1964 | Lissac |
| D199,150 S | 9/1964 | Carmichael |

(Continued)

FOREIGN PATENT DOCUMENTS

CA               485155          7/1952

(Continued)

*Primary Examiner*—Jessica T Stultz
(74) *Attorney, Agent, or Firm*—Bryan Cave LLP

(57) ABSTRACT

A goggle lens comprises a first surface (210) and a second surface (220) separated by a thickness (230, 240) of the goggle lens. The goggle lens is made up of a central region (121), a first lateral region (122) on a first side of the central region, and a second lateral region (123) on an opposite side of the central region. The first surface of the goggle lens is a portion of a first ellipse (211) and the second surface of the goggle lens is a portion of a second ellipse (221). The goggle lens complies with at least one of a MIL-PRF-31013 standard, a EA-L-1381B standard, and a FNS/PD 86-20 standard, all of which define particular specifications for impact resistance.

28 Claims, 4 Drawing Sheets

U.S. PATENT DOCUMENTS

| | | | |
|---|---|---|---|
| D199,932 S | 12/1964 | Shindler | |
| D199,933 S | 12/1964 | Shindler | |
| D201,393 S | 6/1965 | Thomas | |
| D202,129 S | 8/1965 | Marchi | |
| 3,218,765 A | 11/1965 | Volk | |
| D203,136 S | 12/1965 | Shindler | |
| 3,233,249 A | 2/1966 | Baratelli et al. | |
| 3,233,250 A | 2/1966 | Jonassen | |
| D204,957 S | 5/1966 | Dym | |
| 3,283,446 A | 11/1966 | Feinbloom | |
| D210,048 S | 1/1968 | Imperatrice | |
| 3,394,980 A | 7/1968 | Dym | |
| 3,419,909 A | 1/1969 | Spain | |
| 3,526,449 A | 9/1970 | Bollé et al. | |
| 3,531,189 A | 9/1970 | Petito | |
| 3,605,116 A | 9/1971 | Simpson et al. | |
| 3,623,800 A | 11/1971 | Volk | |
| 3,689,136 A | 9/1972 | Atamian | |
| 3,708,224 A | 1/1973 | Linblom | |
| 3,722,986 A | 3/1973 | Tagnon | |
| D228,028 S | 7/1973 | Leblanc et al. | |
| 3,756,704 A | 9/1973 | Marks | |
| D228,583 S | 10/1973 | Leblanc | |
| D231,260 S | 4/1974 | Jelinek | |
| D232,983 S | 10/1974 | Rabuse | |
| 3,950,082 A | 4/1976 | Volk | |
| 4,002,439 A | 1/1977 | Volk | |
| 4,240,718 A | 12/1980 | Wichers | |
| 4,264,987 A | 5/1981 | Runckel | |
| D268,683 S | 4/1983 | Tenny | |
| D270,165 S | 8/1983 | Burns | |
| 4,515,448 A | 5/1985 | Tackles | |
| 4,564,272 A | 1/1986 | Rinnooy Kan | |
| D285,020 S | 8/1986 | Schmidthaler | |
| 4,630,906 A | 12/1986 | Bammert et al. | |
| 4,670,915 A | 6/1987 | Evans | |
| 4,674,136 A | 6/1987 | Ladewig | |
| 4,674,851 A | 6/1987 | Jannard | |
| 4,730,915 A | 3/1988 | Jannard | |
| 4,741,611 A | 5/1988 | Burns | |
| 4,776,045 A | 10/1988 | Mysliwiec et al. | |
| 4,786,125 A | 11/1988 | Magarinos et al. | |
| 4,810,080 A | 3/1989 | Grendol et al. | |
| 4,824,233 A | 4/1989 | Jannard | |
| 4,843,655 A | 7/1989 | Hegendörfer | |
| 4,859,048 A | 8/1989 | Jannard | |
| 4,867,550 A | 9/1989 | Jannard | |
| 4,917,182 A | 4/1990 | Beamer | |
| 4,934,807 A | 6/1990 | Bolle et al. | |
| 4,951,433 A | 8/1990 | Lin | |
| 4,955,087 A | 9/1990 | Perez et al. | |
| 4,973,139 A | 11/1990 | Weinhrauch et al. | |
| 4,976,530 A | 12/1990 | Mackay et al. | |
| 4,978,182 A | 12/1990 | Tedesco | |
| 5,032,017 A | 7/1991 | Bollé et al. | |
| 5,050,981 A | 9/1991 | Roffman | |
| D323,333 S | 1/1992 | Jannard et al. | |
| 5,182,586 A | 1/1993 | Bennato | |
| 5,204,700 A | 4/1993 | Sansalone | |
| 5,208,614 A | 5/1993 | Jannard | |
| 5,220,359 A | 6/1993 | Roffman | |
| 5,235,357 A | 8/1993 | Winthrop et al. | |
| 5,245,709 A | 9/1993 | Shipcott | |
| D344,282 S | 2/1994 | Hirschman | |
| 5,297,298 A | 3/1994 | Salatka et al. | |
| 5,319,007 A | 6/1994 | Bright | |
| 5,321,443 A | 6/1994 | Huber et al. | |
| 5,339,119 A | 8/1994 | Gardner | |
| 5,357,292 A | 10/1994 | Wiedner | |
| 5,359,370 A | 10/1994 | Mugnier | |
| 5,371,555 A | 12/1994 | Nagel | |
| 5,379,463 A | 1/1995 | Schleger et al. | |
| 5,381,192 A | 1/1995 | Canavan et al. | |
| 5,387,949 A | 2/1995 | Tackles | |
| D358,828 S | 5/1995 | Jannard et al. | |
| 5,423,092 A | 6/1995 | Kawai | |
| 5,426,473 A | 6/1995 | Riehm | |
| 5,438,710 A | 8/1995 | McDonald et al. | |
| 5,457,505 A | 10/1995 | Canavan et al. | |
| 5,495,303 A | 2/1996 | Kolentsi | |
| D367,664 S | 3/1996 | Simioni | |
| 5,502,515 A | 3/1996 | Sansalone | |
| 5,604,547 A | 2/1997 | Davis et al. | |
| 5,648,832 A | 7/1997 | Houston et al. | |
| 5,774,201 A | 6/1998 | Tackles | |
| 5,825,455 A | 10/1998 | Fecteau et al. | |
| 5,909,267 A * | 6/1999 | Hall et al. | 351/120 |
| 6,019,469 A | 2/2000 | Fecteau et al. | |
| 6,038,705 A * | 3/2000 | Jarvis | 2/424 |
| 6,893,126 B2* | 5/2005 | Iori et al. | 351/159 |
| 6,929,364 B1* | 8/2005 | Jannard | 351/126 |
| 7,134,752 B2* | 11/2006 | Perrott et al. | 351/159 |

FOREIGN PATENT DOCUMENTS

EP  0121018 A2  10/1984

* cited by examiner

GOGGLE LENS, METHOD OF MANUFACTURING SAME, AND GOGGLE CONTAINING SAME

FIELD OF THE INVENTION

This invention relates generally to goggles, and relates more particularly to goggle lenses.

BACKGROUND OF THE INVENTION

Military goggles, industrial safety goggles, and other protective eyewear, all of which will be referred to herein using the term "goggles," are characterized by a plate or lens that offers protection for a user's eyes while providing a relatively unobstructed view of objects beyond the lens. Typically, such lenses have a cylindrical shape, which is due at least in part to the fact that it is easier to manufacture and optically correct a cylindrical or spherical surface than it is to manufacture and optically correct non-cylindrical surfaces. In spite of those advantages, some lens manufacturers have experimented with non-cylindrical lenses in order to realize the advantages those non-cylindrical lenses provide. For example, elliptical lenses have been used in certain eyewear applications. Elliptical lenses have not been used, however, in eyewear applications where robust impact resistance and other ocular protection is required, likely because it is relatively more difficult to manufacture an elliptical goggle lens having the required protective properties. Accordingly, there exists a need for a goggle lens that meets certain impact resistance and other performance requirements while offering the advantages provided by an elliptical shape.

BRIEF DESCRIPTION OF THE DRAWINGS

The invention will be better understood from a reading of the following detailed description, taken in conjunction with the accompanying figures in the drawings in which.

Figure 1:
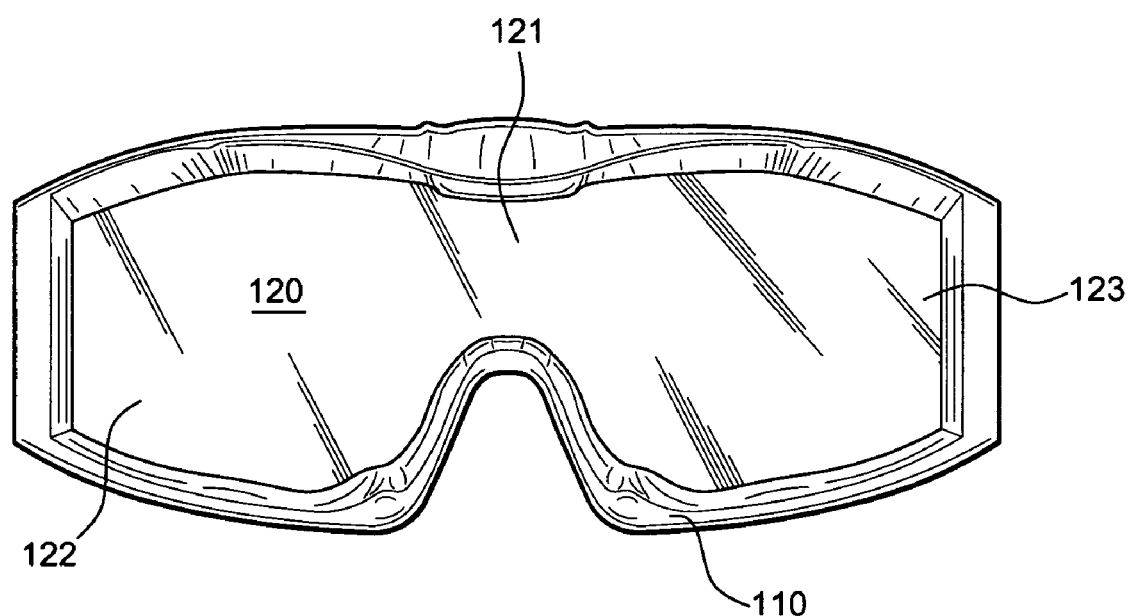
FIG. 1 is a front elevational view of a goggle according to an embodiment of the invention.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical or non-electrical manner.

DETAILED DESCRIPTION OF THE DRAWINGS

In one embodiment of the invention, a goggle lens comprises a first surface and a second surface separated by a thickness of the goggle lens. The goggle lens is made up of a central region, a first lateral region on a first side of the central region, and a second lateral region on an opposite side of the central region. The first surface of the goggle lens is a portion of a first ellipse and the second surface of the goggle lens is a portion of a second ellipse. The goggle lens complies with at least one of a MIL-PRF-31013 standard, a EA-L-1381B standard, and a FNS/PD 86-20 standard or a similar standard, all of which define particular specifications for impact resistance.

Referring now to the figures, FIG. 1 is a front elevational view of a goggle 100 according to an embodiment of the invention. As illustrated in FIG. 1, goggle 100 comprises a frame 110 capable of being secured about a user's face using, for example, a non-illustrated strap or the like, and a goggle lens 120. Frame 110 is secured about the user's face (or other body part) such that goggle lens 120 is located in front of and protects the user's eyes. In the illustrated embodiment, frame 110 has a shape of the kind typically seen for safety goggles, ski goggles, military goggles and the like, but it should be understood that frame 110 could have any of a variety of additional styles and shapes adapted for a variety of applications.

Figure 2:
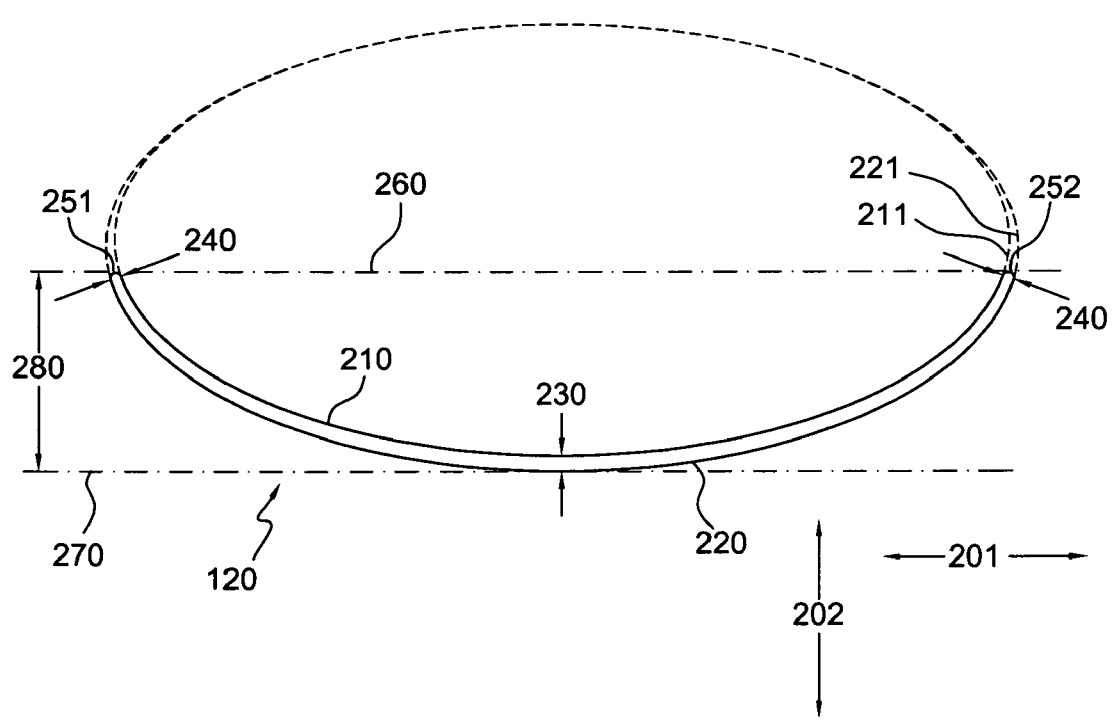
FIG. 2 is a top view of a goggle lens according to an embodiment of the invention.

FIG. 2 is a top view of goggle lens 120 according to an embodiment of the invention. As illustrated in FIGS. 1 and 2, goggle lens 120 comprises a surface 210 and a surface 220 separated by a thickness (230, 240) of goggle lens 120. Goggle lens 120 comprises a central region 121, a lateral region 122 on a first side of central region 121, and a lateral region 123 on an opposite side of central region 121. No boundary lines between central region 121 and the adjoining lateral regions 122 and 123 are shown because the exact position of such boundaries is not of great importance. In general, central region 121 is the region of goggle lens 120 that lies in front of the user's eyes, and lateral regions 122 and 123 are those regions that are in line with the user's peripheral vision.

Surface 210 is a portion of an ellipse 211, and surface 220 is a portion of an ellipse 221. Only a segment of ellipse 211 and of ellipse 221 exist as part of goggle lens 120; the remaining portions of ellipses 211 and 221 are shown in dotted lines to indicate that they appear in the drawings for illustrative purposes only, and are not actually physically present as part of goggle lens 120.

Goggle lens 120 complies with at least one of a MIL-PRF-31013 standard, a EA-L-1381B standard, and a FNS/PD 86-20 standard, all of which define particular specifications for impact resistance. More specifically, MIL-PRF-31013 deals with single lens eyewear, EA-L-1381B deals with gas mask lenses, and FNS/PD 86-20 deals with a goggle lens known as an SWD (sand, wind, and dust) lens. As known in the art, the MIL-PRF-31013 and EA-L-1381B standards require 640-660 feet per second (approximately 195-201 meters per second) impact resistance when using a .15 caliber, T37 shaped projectile, while the FNS/PD 86-20 standard requires ballistic resistance to be within 550 to 560 feet per second (approximately 168-171 meters per second) when using a .22 caliber, T37 shaped projectile. Such impact resistance is achieved by, among other things, selecting an appropriate material for goggle lens 120 (polycarbonate or the like, for example) and by selecting an appropriate thickness for goggle lens 120, as will be further described below.

It was mentioned above that elliptical lenses have been used by certain lens manufacturers. The existing elliptical lenses, however, have not been used for applications requiring impact resistance of the magnitude discussed in the preceding paragraph. Instead, existing uses of elliptical lenses have been confined to applications such as eyeglasses or sunglasses where thinner lenses having relatively lower manufacturing costs are appropriate. The high impact resistance applications for which the present invention is appropriate require greater thicknesses than would be economical or practical for everyday eyewear. As an example, in one embodiment thickness 230 is approximately 0.25 centimeters. This thickness may be constant across the entire length of goggle lens 120, or, as in the illustrated embodiment, goggle lens 120 may be characterized by a taper such that a thickness 240 is approximately 0.20 centimeters. The term "length" herein refers to a longest dimension of goggle lens 120, or in other words a dimension parallel to an arrow 201. Similarly, the term "height" herein refers to a dimension parallel to an arrow 202.

One advantage of using an elliptical lens for military and other applications requiring high impact resistance is that an elliptical lens can be flat at and near the center of the lens, i.e., at the region referred to in FIG. 1 as central region 121, and can have a tight wrap around the lens periphery, thus introducing at the periphery the beneficial negative optical power discussed in the following paragraph. Expressing the foregoing concept in another way, an elliptical lens can be made with a more consistent thickness across its length than can a cylindrical or spherical lens. Having a more consistent thickness is a particular advantage in high impact resistance applications where certain minimum lens thicknesses are required.

Also in the illustrated embodiment, ellipses 211 and 221 have eccentricities that are between approximately 0.85 and 0.90 and arc lengths of at least 18 centimeters. In a particular embodiment, ellipse 211 has an eccentricity of approximately 0.863 and an arc length of approximately 18.7 centimeters, while ellipse 221 has an eccentricity of approximately 0.858 and an arc length of approximately 19.1 centimeters. The given dimensions are ideal for a lens such as goggle lens 120 that may need to be seated in a military or similar goggle. Another advantage of the given dimensions are that they provide goggle lens 120 with a negative optical power at lateral regions 122 and 123 that sharpens an image seen through goggle lens 120 in those lateral regions.

Continuing with the description of the illustrated embodiment, lateral region 122 terminates at a terminus 251 and lateral region 123 terminates at a terminus 252. A line 260 passing through termini 251 and 252 lies in a first plane (perpendicular to the paper on which FIG. 2 appears). A line 270 tangential to a midpoint of ellipse 221 lies in a second plane parallel to the first plane, and the first plane and the second plane are separated from each other by a separation distance 280 that is at least 4 centimeters. In a particular embodiment, the separation distance 280 is approximately 4.4 centimeters.

Figure 3:
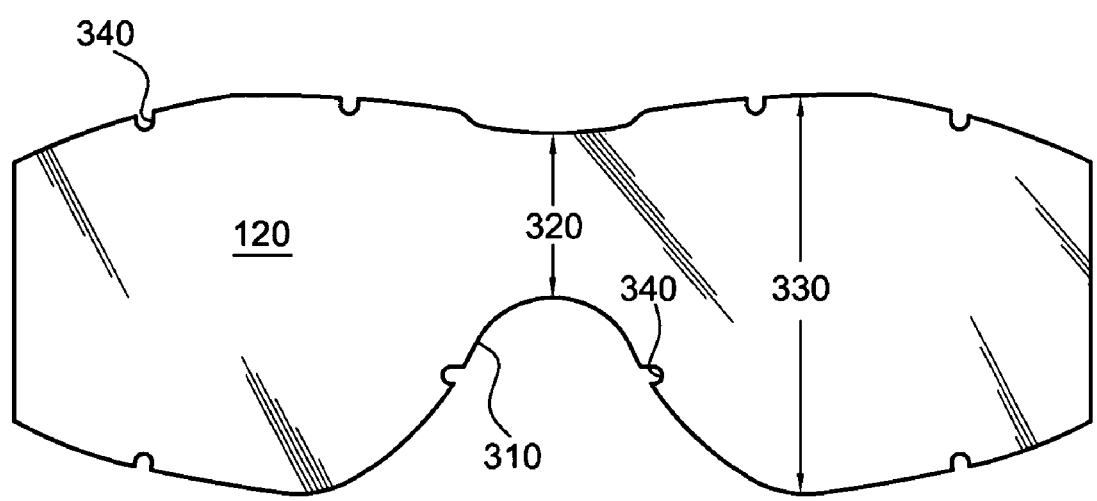
FIG. 3 is a front elevational view of a goggle lens according to an embodiment of the invention.

FIG. 3 is a front elevational view of goggle lens 120 according to an embodiment of the invention. In FIG. 3, goggle lens 120 has been removed from frame 110 that was shown in FIG. 1. As illustrated in FIG. 3, goggle lens 120 comprises a cutout 310 capable of accommodating a user's nose. In a particular embodiment, a smallest height 320 of goggle lens 120 is approximately 3.6 centimeters and a greatest height 330 of goggle lens 120 is approximately 7 centimeters. Goggle lens 120 further comprises an attachment mechanism 340 for attaching goggle lens 120 to frame 110 (see FIG. 1). In the illustrated embodiment, attachment mechanism 340 comprises a plurality of notches cut into a perimeter of goggle lens 120, including a notch cut into the perimeter of goggle lens 120 adjacent to cutout 310. As an example, notches 340 interact with corresponding (and non-illustrated) features on frame 110 in order to hold goggle lens 120 in place in frame 110. A person of ordinary skill in the art will recognize that additional mechanisms for securing goggle lens 120 to frame 110 exist and may be suitable for one or more applications, including, for example, a system incorporating snaps or another fastening device, a metal or plastic band or the like, or a similar mechanism.

Figure 4:
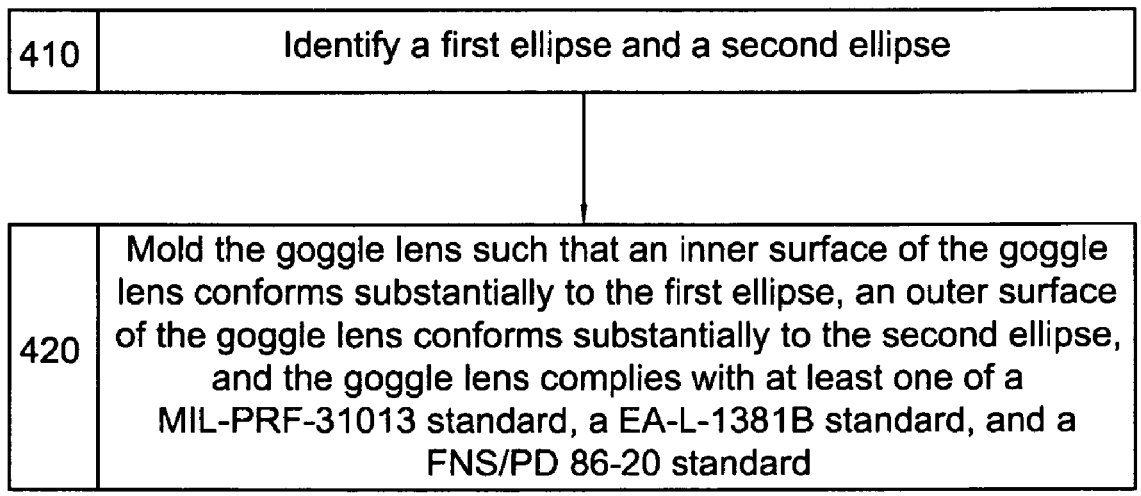
FIG. 4 is a flowchart illustrating a method of manufacturing a goggle lens for a goggle according to an embodiment of the invention.

FIG. 4 is a flowchart illustrating a method 400 of manufacturing a goggle lens for a goggle according to an embodiment of the invention. A step 410 of method 400 is to identify a first ellipse and a second ellipse. As an example, the first ellipse can be similar to ellipse 211 and the second ellipse can be similar to ellipse 221, both of which were shown in FIG. 2. In one embodiment, step 410 or another step comprises identifying a first ellipse having an eccentricity of approximately 0.863 and a second ellipse having an eccentricity of approximately 0.858.

A step 420 of method 400 is to mold the goggle lens such that an inner surface of the goggle lens conforms substantially to the first ellipse, an outer surface of the goggle lens conforms substantially to the second ellipse, and the goggle lens complies with at least one of a MIL-PRF-31013 standard, a EA-L-1381B standard, and a FNS/PD 86-20 standard. As an example, the inner surface can be similar to surface 210 and the outer surface can be similar to surface 220, both of which were shown at least in FIG. 2. In one embodiment, step 420 comprises tapering the goggle lens such that a center of the goggle lens is thicker than a lateral region of the goggle lens, as described above.

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that the goggle lens discussed herein may be implemented in a variety of embodiments, and that the foregoing discussion of certain of these embodiments does not necessarily represent a complete description of all possible embodiments.

Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A goggle lens comprising:
a first surface and a second surface separated by a thickness of the goggle lens, where the goggle lens is made up of:
a central region;
a first lateral region on a first side of the central region; and
a second lateral region on an opposite side of the central region, wherein:
the first surface is a portion of a first ellipse;
the second surface is a portion of a second ellipse; and
the goggle lens complies with an impact resistance requirement of at least one of a MIL-PRF-31013 standard, a EA-L-1381B standard, and a FNS/PD 86-20 standard.

2. The goggle lens of claim 1 wherein:
the first ellipse and the second ellipse have eccentricities that are between 0.85 and 0.90.

3. The goggle lens of claim 1 wherein:
the first ellipse has an eccentricity of approximately 0.863; and
the second ellipse has an eccentricity of approximately 0.858.

4. The goggle lens of claim 1 wherein:
an arc length of the first ellipse is at least 18 centimeters.

5. The goggle lens of claim 4 wherein:
the arc length of the first ellipse is approximately 18.7 centimeters; and
an arc length of the second ellipse is approximately 19.1 centimeters.

6. The goggle lens of claim 1 wherein:
the first lateral region terminates at a first terminus and the second lateral region terminates at a second terminus;
a midpoint of the second ellipse lies in a first plane;
a line passing through the first terminus and the second terminus lies in a second plane that is parallel to the first plane; and
the first plane and the second plane are separated from each other by a separation distance.

7. The goggle lens of claim 6 wherein:
the separation distance is at least 4 centimeters.

8. The goggle lens of claim 7 wherein:
the separation distance is approximately 4.4 centimeters.

9. The goggle lens of claim 1 wherein:
the thickness of the goggle lens varies across a length of the goggle lens.

10. The goggle lens of claim 9 wherein:
the thickness of the goggle lens at the central region is approximately 0.25 centimeters; and
the thickness of the goggle lens at the first and second lateral regions is approximately 0.20 centimeters.

11. The goggle lens of claim 1 further comprising:
a cutout capable of accommodating a user's nose.

12. The goggle lens of claim 11 wherein:
a greatest height of the goggle lens is approximately 7 centimeters; and
a smallest height of the goggle lens is approximately 3.6 centimeters.

13. The goggle lens of claim 1 wherein:
the goggle lens further comprises an attachment mechanism for attaching the goggle lens to a goggle frame.

14. The goggle lens of claim 13 wherein:
the attachment mechanism comprises a plurality of notches cut into a perimeter of the goggle lens.

15. The goggle lens of claim 14 wherein:
the goggle lens further comprises a cutout capable of accommodating a user's nose; and
the plurality of notches includes at least one notch cut into the perimeter of the goggle lens adjacent to the cutout.

16. The goggle lens of claim 1 wherein:
the goggle lens comprises a polycarbonate material.

17. The goggle lens of claim 1 wherein:
the first lateral region and the second lateral region are characterized by a negative optical power.

18. A goggle comprising:
a frame capable of being secured about a user's face; and
a goggle lens comprising:
a first surface and a second surface separated by a thickness of the goggle lens, where the goggle lens is made up of:
a central region;
a first lateral region on a first side of the central region; and
a second lateral region on an opposite side of the central region, wherein:
the first surface is a portion of a first ellipse;
the second surface is a portion of a second ellipse; and
the goggle lens complies with a ballistic resistance requirement of at least one of a MIL-PRF-31013 standard, a EA-L-1381B standard, and a FNS/PD 86-20 standard.

19. The goggle of claim 18 wherein:
the first ellipse has an eccentricity of approximately 0.863 and an arc length of approximately 18.7 centimeters;
the second ellipse has an eccentricity of approximately 0.858 and an arc length of approximately 19.1 centimeters;
the thickness of the goggle lens at the central region is approximately 0.25 centimeters; and
the thickness of the goggle lens at the first and second lateral regions is approximately 0.20 centimeters.

20. The goggle of claim 19 wherein:
the first lateral region terminates at a first terminus and the second lateral region terminates at a second terminus;
a midpoint of the second ellipse lies in a first plane;
a line passing through the first terminus and the second terminus lies in a second plane that is parallel to the first plane; and
the first plane and the second plane are separated from each other by a separation distance that is approximately 4.4 centimeters.

21. A method of manufacturing a goggle lens for a goggle, the method comprising:
identifying a first ellipse;
identifying a second ellipse; and
molding the goggle lens such that:
an inner surface of the goggle lens conforms substantially to the first ellipse;
an outer surface of the goggle lens conforms substantially to the second ellipse; and
the goggle lens complies with an impact resistance requirement of at least one of a MIL-PRF-31013 standard, a EA-L-1381B standard, and a FNS/PD 86-20 standard.

22. The method of claim 21 wherein:
identifying the first ellipse comprises identifying an ellipse having an eccentricity of approximately 0.863; and
identifying the second ellipse comprises identifying an ellipse having an eccentricity of approximately 0.858.

23. The method of claim 21 wherein:
molding the goggle lens further comprises tapering the goggle lens such that a center of the goggle lens is thicker than a lateral region of the goggle lens.

24. The goggle lens of claim 17 wherein:
the central region is devoid of a negative optical power.

25. The goggle lens of claim 18 wherein:
the first lateral region and the second lateral region are characterized by a negative optical power.

26. The goggle lens of claim 25 wherein:
the central region is devoid of a negative optical power.

27. The method of claim 21 wherein:
molding the goggle lens comprises:
incorporating a negative optical power for a first lateral region and a second lateral region of the goggle lens.

28. The method of claim 27 wherein:
molding the goggle lens further comprises:
providing a zero optical power for a central region of the goggle lens located between the first and second lateral regions of the goggle lens.

* * * * *